2 Sheets—Sheet 1.

J. F. NEWHALL.

Assignor of one-half to W. R. KNOWLES, C. H. HILLER, J. E. TUCKER, C. M. SHAW, J. E. NICHOLSON, H. T. MELOON, J. S. CROWLEY, T. WILLIAMS, J. NICHOLSON, and H. MYERS.

SHUTTER WORKER.

No. 11,131. Reissued Dec. 9, 1890.

WITNESSES.

J. M. Hartnett.

B. W. Williams

INVENTOR.

John F. Newhall,

By his Att'y

Henry W. Williams.

THE NORRIS PETERS CO., PHOTO-LITHO., WASHINGTON, D. C.

2 Sheets—Sheet 2.

J. F. NEWHALL.

Assignor of one-half to W. R. KNOWLES, C. H. HILLER, J. E. TUCKER, C. M. SHAW, J. E. NICHOLSON, H. T. MELOON, J. S. CROWLEY, T. WILLIAMS, J. NICHOLSON, and H. MYERS.

SHUTTER WORKER.

No. 11,131. Reissued Dec. 9, 1890.

WITNESSES.
J. H. Hartnett.
B. W. Williams

INVENTOR.
John F. Newhall
By his Atty.
Henry Williams

THE NORRIS PETERS CO., PHOTO-LITHO., WASHINGTON, D. C.

UNITED STATES PATENT OFFICE.

JOHN F. NEWHALL, OF LYNN, MASSACHUSETTS, ASSIGNOR OF ONE-HALF TO WILLIAM R. KNOWLES, CHRISTOPHER G. HILLER, JOSEPH E. TUCKER, CLARENCE M. SHAW, JOHN E. NICHOLSON, HERMAN T. MELOON, JOHN S. CROWLEY, THOMAS WILLIAMS, JAMES NICHOLSON, AND HENRY MYERS, OF SAME PLACE.

SHUTTER-WORKER.

SPECIFICATION forming part of Reissued Letters Patent No. 11,131, dated December 9, 1890.

Original No. 429,793, dated June 10, 1890. Application for reissue filed October 1, 1890. Serial No. 366,786.

*To all whom it may concern:*

Be it known that I, JOHN F. NEWHALL, of Lynn, in the county of Essex and State of Massachusetts, have invented a new and Improved Shutter-Operating Apparatus, of which the following is a specification.

This is a device or apparatus whereby the shutters on the outside of a building can be opened and closed simultaneously from the inside, and it is especially adapted for use in buildings which are provided with metallic shutters intended to prevent the spread of fire.

Figure 1:
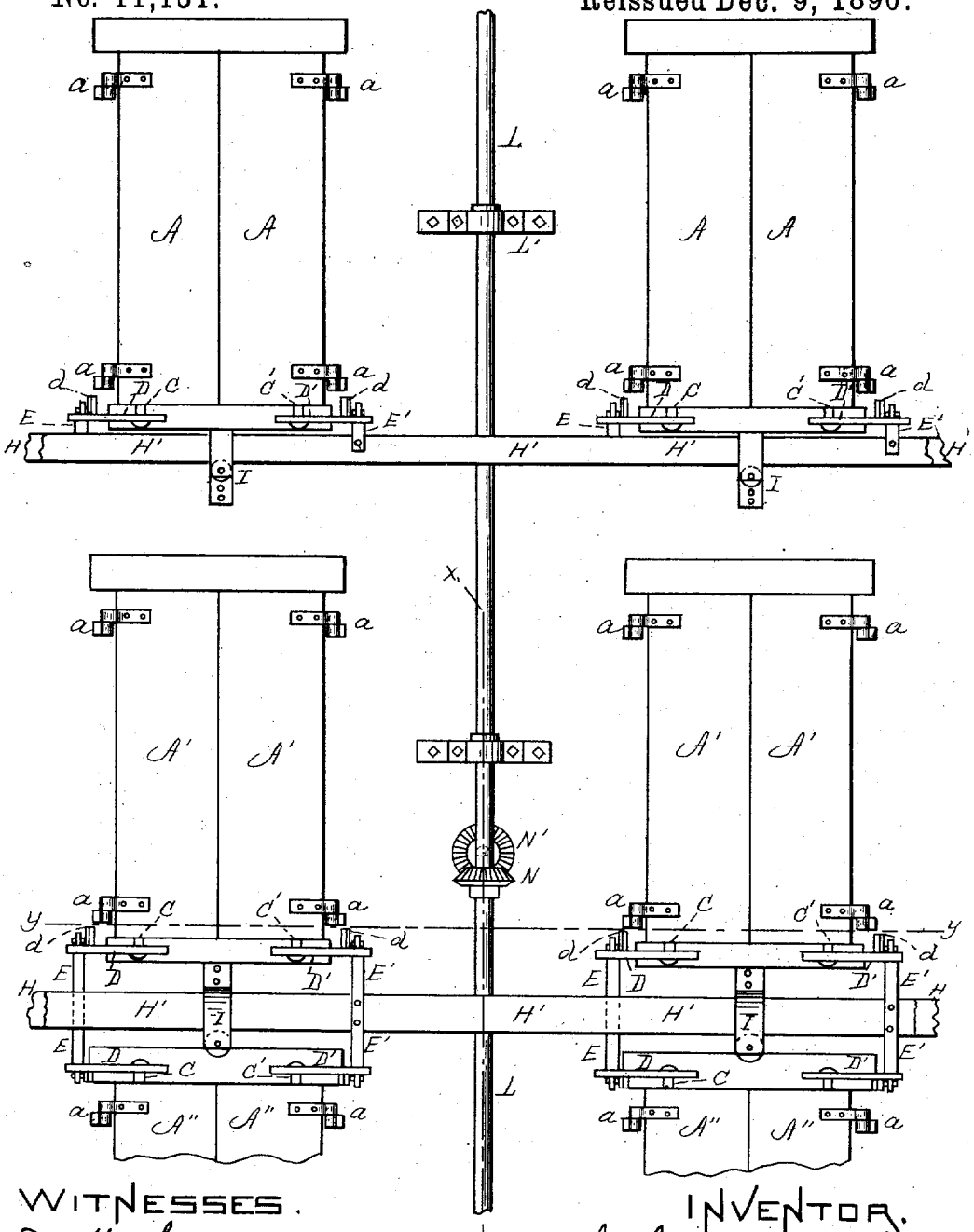
Figure 2:
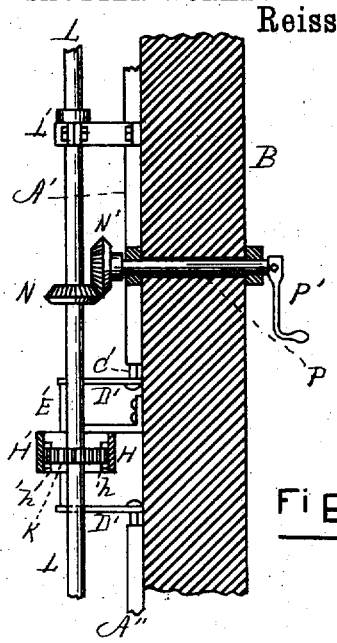
Figure 3:
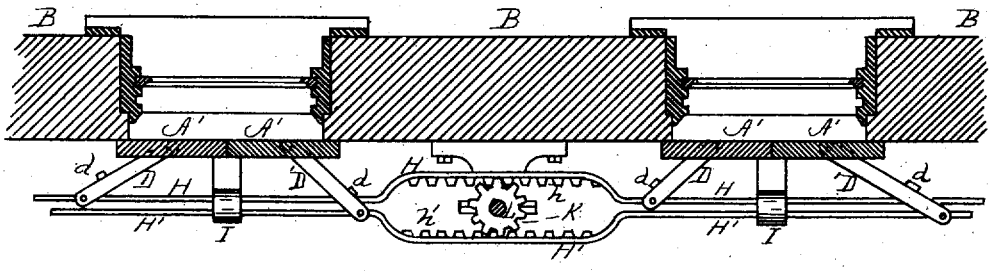
Figure 4:
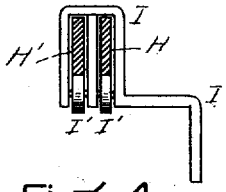

In the accompanying drawings, in which similar letters of reference indicate like parts, Figure 1 is an elevation representing shutters on the outside of a building provided with my device or apparatus. Fig. 2 is a vertical section on line *x*, Fig. 1. Fig. 3 is a horizontal section on line *y*, Fig. 1. Fig. 4 is a sectional detail showing the supporting-bracket containing rollers on which the bars travel.

A A, A′ A′, and A″ A″ represent, respectively, shutters on different stories of a building of which B is a wall. *a a* are the hinges on which said shutters swing.

The lower edges of the shutters A A′ are provided with pins C C′, or equivalent devices, to which is pivotally secured one end of the rods or links D D′. The other ends of these connecting-rods are pivotally secured to posts E E′, rigidly supported by the bars H H′. These bars are situated and extend beneath the windows of a story, and are supported on rollers I′, Fig. 4, held in brackets I, extending from the building. The shutters at the left of the windows in the drawings are connected by means of the pins C, the links D, and the posts E with the inner bar H, or bar next the building, and the shutters at the right of the windows are connected by the pins C′, the links D′, and the posts E′ with the outer bar H′.

It will readily be seen that by moving the bar H to the left or right the left shutters are opened or closed, while by moving the bar H′ to the right or left the right shutters are opened or closed. To move the bars simultaneously in opposite directions would hence open or close all the shutters of the stories with which they are connected. This is accomplished by spreading the bars H H′ near the center, as shown in Figs. 2 and 3, and applying racks *h h′* to their inner surfaces at that point. These racks are engaged by a gear-wheel K, which is fast on the vertical shaft L, which has bearings in the boxes in the brackets L′, secured to the outside of the building. A bevel-gear N is fixed to this shaft, which is engaged by the bevel-gear N′ on the outer end of the horizontal shaft P, which extends through the building-wall, and is actuated by a crank on the inside. By turning this crank the shaft L is rotated, and by means of the racks *h h′* on the bars H H′ at each story the shutters of every story which is connected in the manner above described are opened and closed at a single operation.

In order that the shutters may not swing too far back—*i. e.*, past the center or dead-point—stops *d* are rigidly applied to the rods D D′.

If desired, instead of applying a pair of bars H H′ beneath each row of windows, one pair may be arranged to operate the windows of two stories, as shown in the lower portion of Fig. 1, where the lower edges of the shutters in one story and the upper edges of the shutters in another story are connected in exactly the same manner to bars situated midway between them.

Having thus fully described my invention, what I claim, and desire to secure by Letters Patent, is—

1. In an apparatus for opening and closing the shutters of a plurality of windows in a plurality of stories of a building simultaneously, the combination of a vertical shaft operated from within the building and extending through a plurality of stories thereof, and a pair of horizontal bars at the different stories, said bars being connected at the different stories with said vertical shaft and reciprocated longitudinally horizontally thereby, and each pair of said bars being connected with the shutters of the different windows in one story, whereby the rotation of the said vertical shaft from within the building opens or closes the shutters of the different windows of the different stories simultaneously, substantially as set forth.

2. In an apparatus for opening and closing the shutters of a plurality of windows in a plurality of stories of a building simultaneously, the combination of a vertical shaft operated from within the building and extending through a plurality of stories thereof, and horizontal bars on the different stories, said bars being connected at the different stories with said vertical shaft and reciprocated horizontally thereby, and each of said bars being connected with the shutters of the different windows in one story by pivotal link-connections, whereby the rotation of the said shaft from within the building opens or closes the shutters of the different windows of the different stories simultaneously, substantially as set forth.

3. The herein-described improved shutter-operating apparatus, consisting, essentially, of the bracket I, extending from the outside of the building, horizontal shaft P, provided with the bevel-gear N′, vertical shaft L, provided with the bevel-gear N and gear-wheel K, the horizontal bars H H′, spread apart centrally, as shown, and provided with the internal racks *h h′*, links D D′, provided with the stops *d*, said links having their opposite ends pivoted to said bars and the shutters, said bars H H′ being supported by said brackets and moving on rollers therein and being horizontally and simultaneously reciprocated in opposite directions by means of said gear-wheel K, and internal racks, all arranged and constructed substantially as set forth.

JOHN F. NEWHALL.

Witnesses:
HENRY W. WILLIAMS,
J. M. HARTNETT.